(12) United States Patent
Ampulski et al.

(10) Patent No.: US 6,251,331 B1
(45) Date of Patent: Jun. 26, 2001

(54) PROCESS AND APPARATUS FOR MAKING PAPERMAKING BELT USING FLUID PRESSURE DIFFERENTIAL

(75) Inventors: Robert S. Ampulski, Fairfield; Vladimir Vitenberg, Cincinnati; Larry L. Huston, West Chester, all of OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/150,385

(22) Filed: Sep. 9, 1998

(51) Int. Cl.[7] ............................................. B29C 67/00
(52) U.S. Cl. ....................... 264/510; 264/570; 264/571; 264/257; 264/511
(58) Field of Search .............................. 264/510, 511, 264/571, 257, 258, 166, 570, 167; 425/113, 371, 504, 515, 114, 520

(56) References Cited

U.S. PATENT DOCUMENTS

| | | | |
|---|---|---|---|
| 3,515,778 | 6/1970 | Fields et al. ........................... | 264/40 |
| 4,078,032 | 3/1978 | Wenner ................................. | 264/167 |
| 4,097,634 | 6/1978 | Bergh ................................... | 428/156 |
| 4,111,634 | 9/1978 | Limbach et al. . | |
| 4,358,332 | 11/1982 | Rodish ................................. | 156/356 |
| 4,514,345 | 4/1985 | Johnson et al. . | |
| 4,528,239 | 7/1985 | Trokhan . | |
| 4,529,480 | 7/1985 | Trokhan . | |
| 4,543,225 | 9/1985 | Beaujean ............................... | 264/167 |
| 4,552,620 | 11/1985 | Adams ................................. | 162/358 |
| 4,637,859 | 1/1987 | Trokhan . | |
| 5,073,235 | 12/1991 | Trokhan ............................... | 162/199 |
| 5,098,522 | 3/1992 | Smurkoski et al. . | |
| 5,225,140 | * 7/1993 | Hayashikoshi et al. .............. | 264/571 |
| 5,260,171 | 11/1993 | Smurkoski et al. . | |
| 5,275,700 | 1/1994 | Trokhan . | |
| 5,328,565 | 7/1994 | Rasch et al. . | |
| 5,334,289 | 8/1994 | Trokhan et al. . | |
| 5,364,504 | 11/1994 | Smurkoski et al. . | |
| 5,431,786 | 7/1995 | Rasch et al. . | |
| 5,496,624 | 3/1996 | Stelljes, Jr. et al. . | |
| 5,500,277 | 3/1996 | Trokhan et al. . | |
| 5,514,523 | 5/1996 | Trokhan et al. . | |

(List continued on next page.)

FOREIGN PATENT DOCUMENTS

| | | |
|---|---|---|
| 0 394 134 A1 | 10/1990 | (EP) . |
| 0 493 756 A1 | 7/1992 | (EP) . |
| WO 86/05220 | 9/1986 | (WO) . |
| WO 99/35332 | 7/1999 | (WO) . |

Primary Examiner—Mathieu D. Vargot
(74) Attorney, Agent, or Firm—Vladimir Vitenberg; Tara M. Rosnell

(57) ABSTRACT

A process and an apparatus for making a papermaking belt are provided, the belt comprising a reinforcing structure and a resinous framework joined together. The preferred continuous process comprises the steps of depositing a flowable resinous material onto a patterned molding surface; continuously moving the molding surface and the reinforcing structure at a transport velocity such that at least a portion of the reinforcing structure is in a face-to-face relationship with a portion of the molding surface; applying a fluid pressure differential to transfer the flowable resinous material from the molding surface onto the reinforcing structure and causing the flowable resinous material and the reinforcing structure to join together; and solidifying the resinous material thereby forming the resinous framework joined to the reinforcing structure. The apparatus comprises a molding member having a patterned molding surface preferably comprising a plurality of molding pockets to carry a flowable resinous material therein; a means for depositing the flowable resinous material into the molding pockets of the molding surface; a means for moving the reinforcing structure and the molding member in a predetermined direction; and a means for creating a fluid pressure differential sufficient to transfer the flowable resinous material from the molding member to the reinforcing structure.

16 Claims, 8 Drawing Sheets

U.S. PATENT DOCUMENTS

| | | |
|---|---|---|
| 5,529,664 | 6/1996 | Trokhan et al. . |
| 5,554,333 | 9/1996 | Fujiki .................................. 264/284 |
| 5,554,467 | 9/1996 | Trokhan et al. . |
| 5,566,724 | 10/1996 | Trokhan et al. . |
| 5,589,122 | 12/1996 | Leonard et al. ..................... 264/146 |
| 5,624,790 | 4/1997 | Trokhan et al. . |
| 5,628,876 | 5/1997 | Ayers et al. . |
| 5,669,120 | 9/1997 | Wessels et al. ......................... 24/446 |
| 5,679,222 | 10/1997 | Rasch et al. ...................... 162/358.1 |
| 5,714,041 | 2/1998 | Ayers et al. . |
| 5,851,467 | 12/1998 | Murasaki .............................. 264/167 |
| 5,972,813 | 10/1999 | Polat et al. ........................... 442/320 |

* cited by examiner

PROCESS AND APPARATUS FOR MAKING PAPERMAKING BELT USING FLUID PRESSURE DIFFERENTIAL

FIELD OF THE INVENTION

The present invention generally relates to papermaking belts useful in papermaking machines for making strong, soft, absorbent paper products. More particularly, the invention relates to papermaking belts comprising a resinous framework and a reinforcing structure joined thereto.

BACKGROUND OF THE INVENTION

Generally, a papermaking process includes several steps. Typically, an aqueous slurry of papermaking fibers is formed into an embryonic web on a foraminous member, such as, for example, as a Fourdrinier wire. After the initial forming of the paper web on the Fourdrinier wire, or forming wires, the paper web is carried through a drying process or processes on another piece of papermaking clothing in the form of endless belt which is often different from the Fourdrinier wire or forming wires. This other clothing is commonly referred to as a drying fabric or belt. While the web is on the drying belt, the drying or dewatering process can involve vacuum dewatering, drying by blowing heated air through the web, a mechanical processing, or a combination thereof. in through-air-drying processes developed and commercialized by the present assignee, the drying fabric may comprise a so-called deflection member having a macroscopically monoplanar, continuous, and preferably patterned and non-random network surface which defines a plurality of discrete, isolated from one another deflection conduits. Alternatively, the deflection member may comprise a plurality of discrete protuberances isolated from one another by a substantially continuous deflection conduit, or be semi-continuous. The embryonic web is associated with the deflection member. During the papermaking process, the papermaking fibers in the web are deflected into the deflection conduits and water is removed from the web through the deflection conduits. The web then is dried and can be foreshortened, by, for example, creping. Deflection of the fibers into the deflection conduits of the papermaking belt can be induced by, for example, the application of differential fluid pressure to the embryonic paper web. One preferred method of applying differential pressure is exposing the web to a fluid pressure differential through the drying fabric comprising the deflection member.

Through-air-dried paper webs may be made according to any commonly assigned and incorporated herein by reference U.S. Pat. No. 4,529,480 issued to Trokhan on Jul. 16, 1985; U.S. Pat. No. 4,637,859 issued to Trokhan on Jan. 20, 1987; U.S. Pat. No. 5,364,504, issued to Smurkoski et al. on Nov. 15, 1994; U.S. Pat. No. 5,529,664, issued to Trokhan et al. on Jun. 25, 1996; and U.S. Pat. No. 5,679,222, issued to Rasch et al. on Oct. 21, 1997.

Generally, a method of making the deflection member comprises applying a coating of liquid photosensitive resin to a surface of a foraminous element, controlling the thickness of the coating to a pre-selected value, exposing the coating of the liquid photosensitive resin to light in an activating wave-length through a mask, thereby preventing or reducing curing of selected portions of the photosensitive resin. Then the uncured portions of the photosensitive resin are typically washed away by showers. Several commonly assigned U.S. Patents which are incorporated herein by reference, disclose papermaking belts and methods of making the belts: U.S. Pat. No. 4,514,345, issued Apr. 30, 1985 to Johnson et al.; U.S. Pat. No. 4,528,239, issued Jul. 9, 1985 to Trokhan; U.S. Pat. No. 5,098,522, issued Mar. 24, 1992; U.S. Pat. No. 5,260,171, issued Nov. 9, 1993 to Smurkoski et al.; U.S. Pat. No. 5,275,700, issued Jan. 4, 1994 to Trokhan; U.S. Pat. No. 5,328,565, issued Jul. 12, 1994 to Rasch et al.; U.S. Pat. No. 5,334,289, issued Aug. 2, 1994 to Trokhan et al.; U.S. Pat. No. 5,431,786, issued Jul. 11, 1995 to Rasch et al.; U.S. Pat. No. 5,496,624, issued Mar. 5, 1996 to Stelijes, Jr. et al.; U.S. Pat. No. 5,500,277, issued Mar. 19, 1996 to Trokhan et al.; U.S. Pat. No. 5,514,523, issued May 7, 1996 to Trokhan et al.; U.S. Pat. No. 5,554,467, issued Sep. 10, 1996, to Trokhan et al.; U.S. Pat. No. 5,566,724, issued Oct. 25, 1996 to Trokhan et al.; U.S. Pat. No. 5,624,790, issued Apr. 29, 1997 to Trokhan et al.; U.S. Pat. No. 5,628,876 issued May 13, 1997 to Ayers et al.; U.S. Pat. No. 5,679,222 issued Oct. 21, 1997 to Rasch et al.; and U.S. Pat. No. 5,714,041 issued Feb. 3, 1998 to Ayers et al., the disclosures of which are incorporated herein by reference.

While curing of the photosensitive resin has proved to be an effective way of making the papermaking belt, a search for improved methods and products has continued. Now, it is believed that the deflection member may be made by at least several other methods which do not necessarily require the use of the curing radiation.

Accordingly, the present invention provides a novel process for making a papermaking belt by first, forming a desired pattern of a fluid resinous material in a molding member, and then transferring the resinous material from the molding member to the reinforcing structure and solidifying the patterned resinous material. The present invention also provides a process wherein the transferal of the resinous material from the molding member to the reinforcing structure is assisted by application of fluid pressure differential. The present invention also provides a process that reduces the amount of the resinous material required to construct the papermaking belt comprising a reinforcing structure and a patterned resinous framework. The present invention also provides an apparatus comprising a molding member for forming a desirable pattern of the resinous material and subsequently transferring the patterned resinous material to the reinforcing structure of the belt being constructed.

These and other objects of the present invention will be more readily apparent when considered in reference to the following description, in conjunction with the accompanying drawings.

SUMMARY OF THE INVENTION

A papermaking belt that can be made by a process and an apparatus of the present invention comprises a reinforcing structure and a patterned resinous framework joined thereto. The reinforcing structure has a first side and an opposite second side. Preferably, but not necessarily, the reinforcing structure comprises a fluid-permeable element, such as, for example, a woven fabric or a screen having a plurality of open areas therethrough. The reinforcing structure may also comprise a felt. The resinous framework has a top side and a bottom side, the top and bottom sides corresponding to the first and second sides of the reinforcing structure, respectively. The resinous framework may have a substantially continuous pattern, a discrete pattern, or a semi-continuous pattern.

A process for making a papermaking belt comprising a reinforcing structure and a resinous framework joined thereto includes the following steps: providing a reinforcing structure having a first side, a second side opposite to the first side, and a thickness formed therebetween; providing a flowable resinous material; providing an at least partially fluid-permeable molding member; depositing the flowable resinous material onto or into the molding member, preferably in a pre-selected pattern; juxtaposing the reinforcing structure with the molding member; applying a fluid pressure differential to the flowable resinous material associated with the molding member thereby transferring the flowable resinous material from the molding member to the reinforcing structure, preferably substantially in the preselected pattern, and causing the flowable resinous material and the reinforcing structure to join together; and solidifying the resinous material thereby forming the resinous framework joined to the reinforcing structure.

Preferably, the process further comprises a step of pre-solidifying the flowable resinous material prior to the step of applying a fluid pressure differential such that the resinous material reaches a condition in which it can sufficiently retain a desired shape during the step of applying the fluid pressure differential. The flowable resinous material preferably penetrates into the thickness of the reinforcing structure. Preferably such penetration occurs during the step of applying the fluid pressure differential and is sufficient for the resinous material to effectively join the reinforcing structure by locking on individual elements thereof. The apparatus of the present invention preferably comprises a means for pre-solidifying and/or solidifying the flowable resinous material, which means depends on the nature of the resinous material The step of depositing the flowable resinous material onto or into the molding member preferably comprises contacting the molding member with the flowable resinous material and then removing excess of the flowable resinous material from the molding member. Any means known in the art may be used to deposit the flowable resinous material onto or into the molding member. The examples include: a trough, a spray, an extruder. Preferably, the flowable resinous material is deposited onto or into the molding member in a pre-selected pattern.

The molding member has a molding surface preferably comprising a plurality of fluid-permeable molding pockets structured to receive the flowable resinous material therein. The molding pockets may form a substantially continuous pattern, a pattern of discrete molding pockets, or a semi-continuous pattern. In some embodiments, at least some of the molding pockets may have differential depths. The molding member may further comprise a pattern of recesses for receiving the reinforcing structure therein. In one embodiment, the molding member comprises a molding roll having a circumference and a longitudinal axis perpendicular to the machine direction, the molding roll being rotatable about its longitudinal axis. In another embodiment, the molding member comprises at least one endless band structured and designed to continuously travel in a predetermined direction.

An embodiment is contemplated in which the molding pockets are formed by orifices through at least a portion of the molding member. In one embodiment the molding member comprises a first band having orifices therethrough, and a second band, wherein a portion of the first band is in a contacting face-to-face relationship with a portion of the second band. When the flowable resinous material is deposited onto or into such a molding member, the flowable resinous material is disposed within the orifices of the first band and may be supported by the second band. Then, at a certain point in the process the first and second bands separate such that preferably only the first band is juxtaposed with the reinforcing structure.

The preferred flowable resinous material comprises a material selected from the group consisting of epoxies, silicones, urethanes, polystyrenes, polyolefins, polysulfides, nylons, butadienes, photopolymers, and any combination thereof. The flowable resinous material is preferably supplied and deposited onto or into the molding member in a liquid form. The surface energy of the molding surface in contact with the resinous material is preferably lower than the surface energy of the reinforcing structure. Prior to depositing the resinous material onto or into the molding member, the molding surface of the molding member may be treated with a release agent to lower the surface energy of the molding surface.

In the preferred continuous process a further step is required of continuously moving the molding member and the reinforcing structure at a transport velocity such that at least a portion of the reinforcing structure is in a face-to-face relationship with at least a portion of the molding member. Preferably, the reinforcing structure contacts the molding member. The reinforcing structure and/or the molding surface may be supported by a support roll or an endless support band. The support roll is preferably juxtaposed with the molding member to form a nip therebetween. The support band is preferably juxtaposed with the molding member and is structured to move in a contacting face-to-face relationship with at least a portion of the reinforcing structure and/or the molding member. The preferred apparatus of the present invention has a machine direction, and comprises a means for moving the reinforcing structure and the molding member, and preferably a means for moving the support roll or band, in the machine direction such that a portion of the reinforcing structure is in a face-to-face, and preferably contacting, relationship with a portion of the molding member. The apparatus may have optional means for pressing the reinforcing structure and the molding surface relative to each other for a predetermined period of time.

A means for creating a fluid pressure differential may include any means known in the art, for example a vacuum apparatus. The fluid pressure differential should be sufficient to transfer the flowable resinous material from the molding member to the reinforcing structure.

Preferably, the process includes a step of controlling a caliper of the belt being constructed, and more specifically a thickness of the resinous material joined to the reinforcing structure, to at least one pre-selected value. The thickness of the resinous material may be controlled by a caliper-controlling device, including but not limited to a pair of juxtaposed rolls forming a clearance therebetween, or any other means known in the art, such as, for example, a laser beam, a knife, etc.

Preferably, the flowable resinous material is transferred from the molding member to the reinforcing structure substantially in a pre-selected pattern. Depending on the desired pattern of the resinous framework of the belt being constructed, the resinous material may be transferred to the reinforcing structure in a substantially continuous pattern, in a pattern comprising a plurality of discrete protuberances, or in a semi-continuous pattern. Preferably, the resinous material extends outwardly from the first side of the reinforcing structure after the resinous material has been joined to the reinforcing structure.

The reinforcing structure may comprise a variety of forms. One preferred reinforcing structure comprises a woven fabric or a screen having a plurality of open areas therethrough. Another preferred reinforcing structure comprises a felt. The reinforcing structure comprising a combination of the woven fabric and the felt is also contemplated.

DETAILED DESCRIPTION OF THE INVENTION

Papermaking Belt

Figure 7:
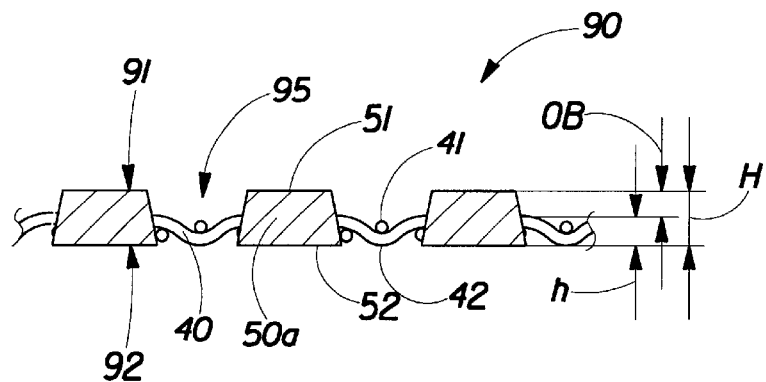
FIG. 7 is a schematic partial cross-sectional view (taken along lines 7—7 of FIG. 7A) of one exemplary embodiment of the papermaking belt which may be made using the process and the apparatus of the present invention, the belt comprising a substantially continuous framework joined to the reinforcing structure, and a plurality of discrete deflection conduits.
Figure 9:
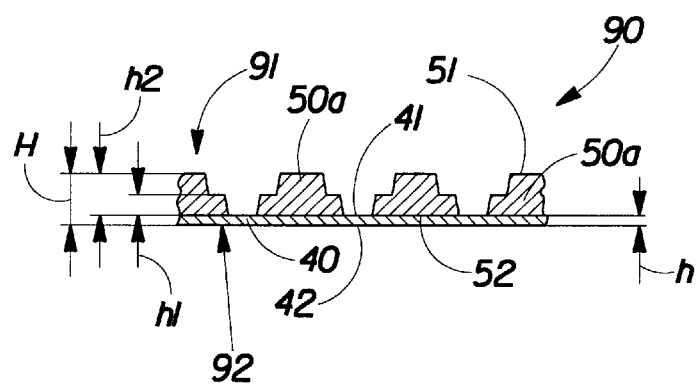
FIG. 9 is a schematic partial cross-sectional view (taken along lines 9—9 of FIG. 9A) of another exemplary embodiment of the papermaking belt which may be made using the process and the apparatus of the present invention, the belt comprising a plurality of discrete protuberances having differential overburdens.

A representative papermaking belt 90 which can be made in accordance with the present invention is schematically shown in FIGS. 7, 7A, 9, and 9A. As used herein, the term "papermaking belt," or simply "belt," refers to a substantially microscopically-monoplanar structure designed to support, and preferably carry, a web thereon during at least one stage of a papermaking process. Typically, modern industrial-scale processes utilize endless papermaking belts, but it is to be understood that the present invention may be used for making discrete portions of the belt 90 or stationary, as well as rotary, plates which may be used for making web handsheets, rotating drums, etc. As FIGS. 7 and 9 show, the belt 90 has a web-contacting side 91 and a backside 92 opposite to the webcontacting side 91. The papermaking belt 90 is said to be macroscopically-monoplanar because when a portion of the belt 90 is placed into a planar configuration, the web-side 91, viewed as a whole, is essentially in one plane. It is said to be "essentially" monoplanar to recognize the fact that deviations from absolute planarity are tolerable, while not preferred, so long as these deviations are not substantial enough to adversely affect the performance of the belt 90 for the purposes of a particular papermaking process.

The papermaking belt 90 which can be made in accordance with the present invention generally comprises two primarily elements: a framework 50a (preferably, a hardened polymeric resinous framework made of a flowable polymeric resinous material 50) and a reinforcing structure 40. The reinforcing structure 50a and the resinous framework 40 are joined together. The reinforcing structure 40 has a first side 41 and a second side 42 opposite to the first side 41. The first side 41 may contact papermaking fibers during the papermaking process, while the second side 42 typically contacts the papermaking equipment, such as, for example, a vacuum pickup shoe and a multi-slot vacuum box (both not shown).

Figure 7A:
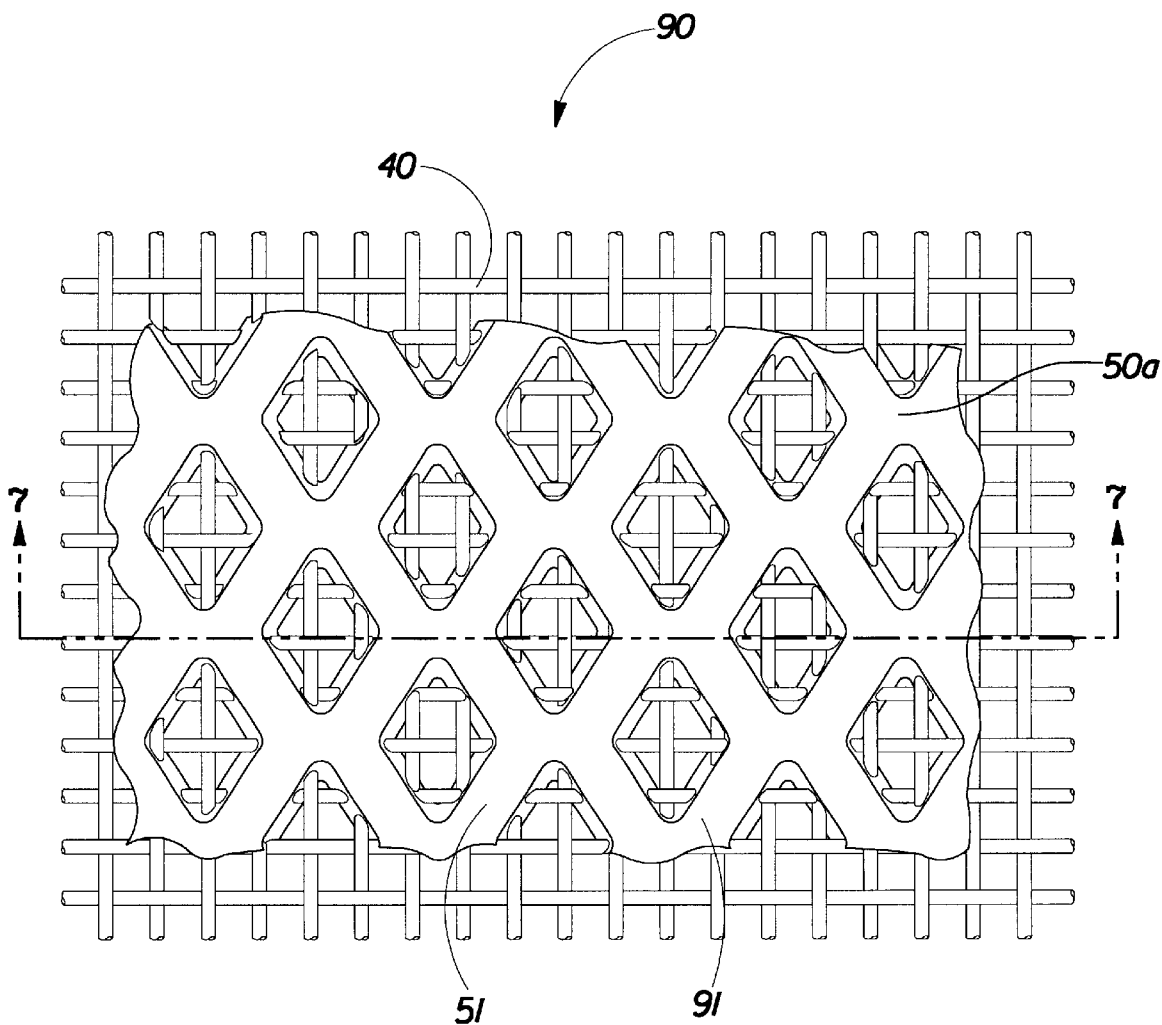
FIG. 7A is a schematic top plan view taken along lines 7A—7A of FIG. 7.

The reinforcing structure 40 can take any number of different forms. It can comprise a woven element, a non-woven element, a screen, a net, a band, a plate, etc. In one preferred embodiment, the reinforcing structure 40 comprises a woven element formed by a plurality of interwoven yarns, as shown in FIGS. 7 and 7A. More particularly, the woven reinforcing structure 40 may comprise a foraminous woven element, such as disclosed in commonly-assigned U.S. Pat. No. 5,334,289, issued in the name of Trokhan et al., on Aug. 2, 1994, and incorporated by reference herein. The reinforcing structure 40 comprising a woven element may be formed by one or several layers of interwoven yarns, the layers being substantially parallel to each other and interconnected in a contacting face-to-face relationship. Commonly-assigned U.S. Pat. No. 5,679,222, issued to Rasch et al. on Oct. 21, 1997; commonly assigned U.S. Pat. No. 5,496,624, issued on Mar. 5, 1996 in the names of Stelljes, Jr. et al.; and commonly assigned patent application Ser. No. 08/696,712 filed in the name of Boutilier on Aug. 14, 1996 and entitled "Papermaking Belt Having Bilaterally Alternating Tie Yarns" are incorporated by reference herein. The papermaking belt 90 may also be made using the reinforcing structure 40 comprising a felt as set forth in a commonly assigned patent application Ser. No. 08/391,372, filed Feb. 15, 1995, in the name of Trokhan et al. and entitled "Method of Applying a Curable Resin to Substrate for Use in Papermaking," which Application is incorporated herein by reference.

The reinforcing structure 40 of the belt 90 strengthens the resinous framework 50a and preferably has a suitable projected area into which the papermaking fibers can deflect under pressure during the papermaking process. According to the present invention, the reinforcing structure 40 is preferably fluid-permeable. As used herein, the term "fluid-permeable" refers, in the context of the reinforcing structure 40, to a condition of the reinforcing structure 40, which condition allows fluids, such as water and air, to pass through the reinforcing structure 40 in at least one direction. As one skilled in the art will readily recognize, the belts comprising a fluid-permeable reinforcing structures are typically used in through-air-dry processes of making a paper web.

Figure 6:
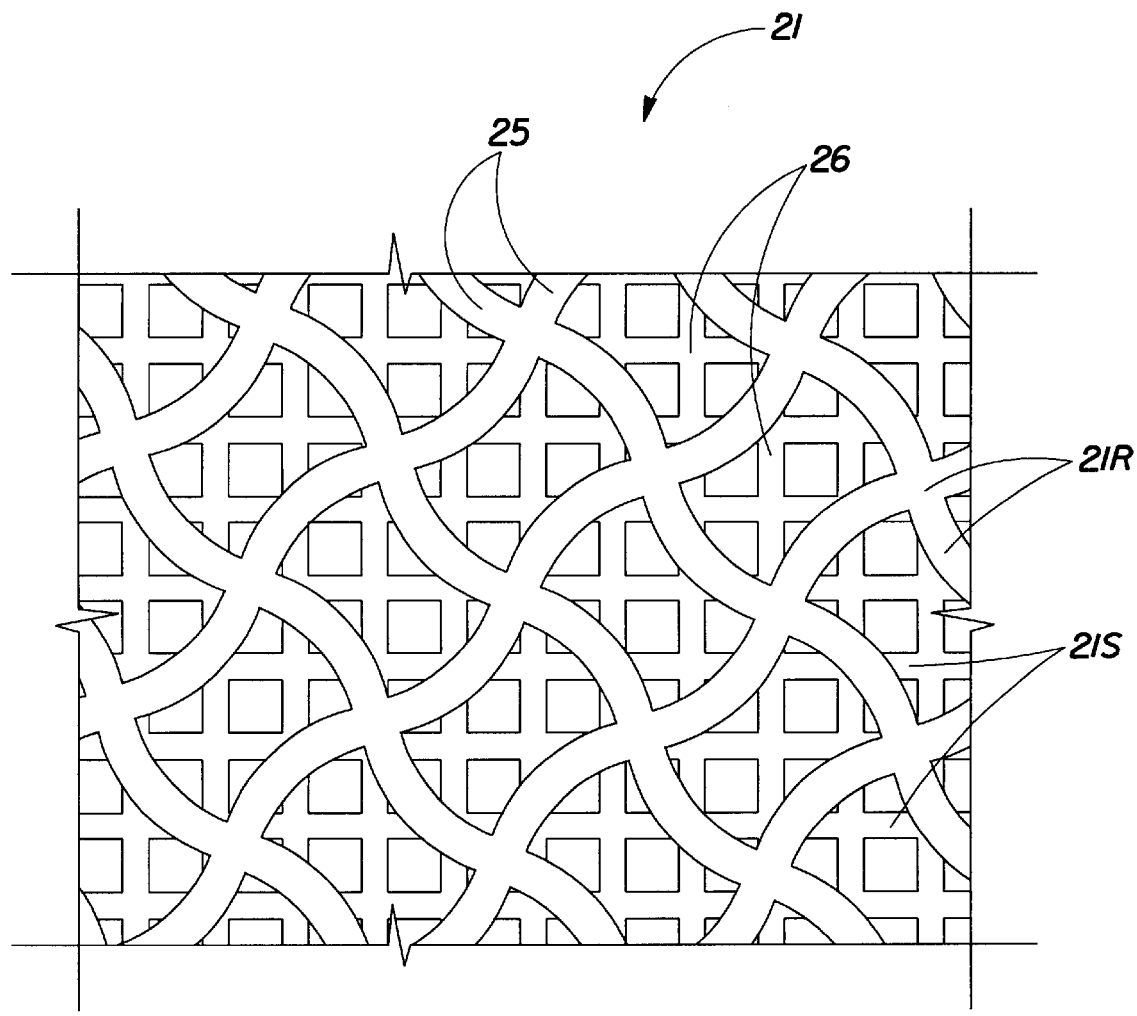
FIG. 6 is a fragmentary and schematic planar representation of one exemplary embodiment of the molding member comprising a pattern of molding pockets for receiving a flowable resin, and a pattern of recesses for receiving the reinforcing structure, two patterns being mutually interposed and having differential depths.
Figure 6A:
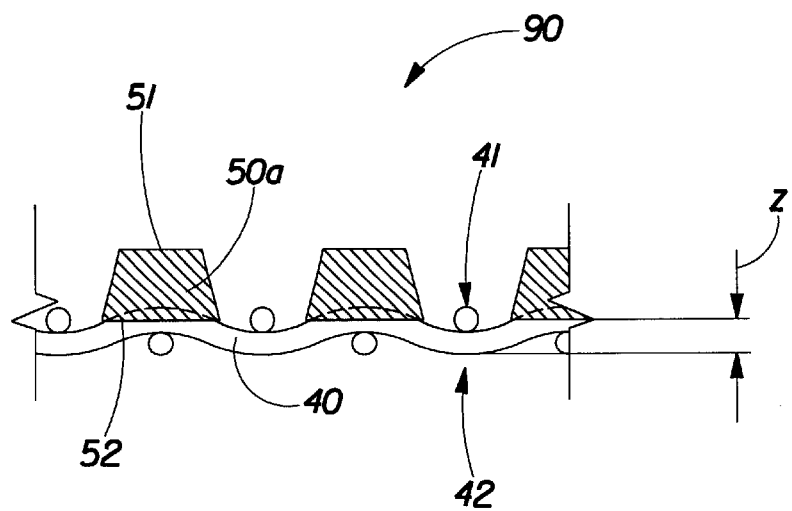
FIG. 6A is a partial cross-sectional side view of the papermaking belt which may be made using the process and the apparatus of the present invention, the belt having a distance formed between a second side of the reinforcing structure and a bottom side of the resinous framework.

As shown in FIGS. 7, 7a, 9, 9a, the reinforcing structure 40 is joined to the resinous framework 50a. The resinous framework 50a comprises a solidified resinous material 50, i. e., the resinous framework 50a is a solid phase of the fluid resinous material 50. In that sense, the terms "resinous material 50" and the "resinous framework 50a" may be used interchangeably where appropriate in the context of the present description. The resinous framework 50a has a top side 51 and a bottom side 52 opposite to the top side 51. During the papermaking process, the top side 51 of the framework 50a contacts the papermaking fibers, and thus defines the pattern of the paper web being produced. The bottom side 52 of the framework 50a may, at least in some embodiments (FIGS. 7 and 7A), contact the papermaking equipment, in which embodiments the bottom side 52 of the framework 50a and the second side 42 of the reinforcing structure 40 may be disposed in the same macro-plane. Alternatively, a distance Z may be formed between the bottom side 52 of the framework 50a and the second side 42 of the reinforcing structure, as shown in FIG. 6A.

Another embodiment (not shown) of the framework 50a may comprise the bottom side 52 having a network of passageways that provide backside surface texture irregularities, as described in commonly-assigned U.S. Pat. No. 5,275,700 issued on Jan. 4, 1994 to Trokhan, which patent is incorporated by reference herein. The two latter embodiments of the framework 50a—one having the distance between the bottom side 52 of the framework 50a and the second side 42 of the reinforcing structure 40 (FIG. 6A), and the other having the backside texture irregularities—beneficially provide leakage between the bottom side 52 of the framework 50 and a surface of the papermaking equipment. The leakage reduces, or even eliminates altogether, a sudden application of the vacuum pressure to the paper web during the papermaking process, thereby mitigating a phenomenon known as pinholing.

The framework 50a which is "angled" relative to the first surface 41 of the reinforcing structure 40 is contemplated in the present invention. As used herein the term "angled" framework 50a refers to the framework 50a in which—if viewed in a cross-section—acute angles are formed between the first surface 41 of the reinforcing structure 40 and longitudinal axes of either discrete deflection conduits 95 (in the instance of the continuous framework 50a), or discrete protuberances (in the instance of the framework 50a comprising a plurality of discrete protuberances). These embodiments are disclosed in commonly assigned patent applications Ser. No. 08/858,661, and Ser. No. 08/858,662, both applications entitled "Cellulosic Web, Method and Apparatus For Making the Same Using Papermaking Beft Having Angled Cross-sectional Structure, and Method Of Making the Belt," and filed in the name of Larry L. Huston on May 19, 1997, the disclosures of which applications are incorporated herein by reference.

Process and Apparatus

A first step of the process according to the present invention comprises providing a reinforcing structure 40. As has been explain above, the reinforcing structure 40 is a substrate that may comprise a variety of different forms, such as, for example, a woven fabric, a felt, a screen, a band, etc. A more detailed description of the reinforcing structure 40, particularly one comprising a woven element, is found in commonly-assigned U.S. Pat. No. 5,275,700 incorporated herein by reference. Regardless of its specific embodiment, the reinforcing structure 40 has a first side 41 and a second side 42, as best shown in FIGS. 6A, 7, and 9. In the formed papermaking belt 90, the first side 41 faces (and in some embodiments may contact) the papermaking fibers during the papermaking process, while the second side 42, opposite to the first side 41, faces (and typically contacts) the papermaking equipment. As used herein, the first side 41 and the second side 42 of the reinforcing structure 40 are consistently referred to by these respective names regardless of incorporation (i. e., prior, during, and after the incorporation) of the reinforcing structure 40 into the papermaking belt 90. A distance between the first side 41 and the second side 42 of the reinforcing structure forms a thickness of the reinforcing structure, designated herein as "h" (FIGS. 7 and 9). In the preferred continuous process of the present invention, the reinforcing structure 40 continuously moves in a machine direction, indicated in several figures as "MD." The use herein of the term "machine direction" is consistent with the traditional use of the term in papermaking, where this term refers to a direction which is parallel to the flow of the paper web through the papermaking equipment. As used herein, the "machine direction" is a direction parallel to the flow of the reinforcing structure 40 during the process of the present invention. It should be understood that the machine direction is a relative term defined in relation to the movement of the reinforcing structure 40 at a particular point of the process. Therefore, the machine direction may (and typically does) change several times during a given process of the present invention.

Figure 1:
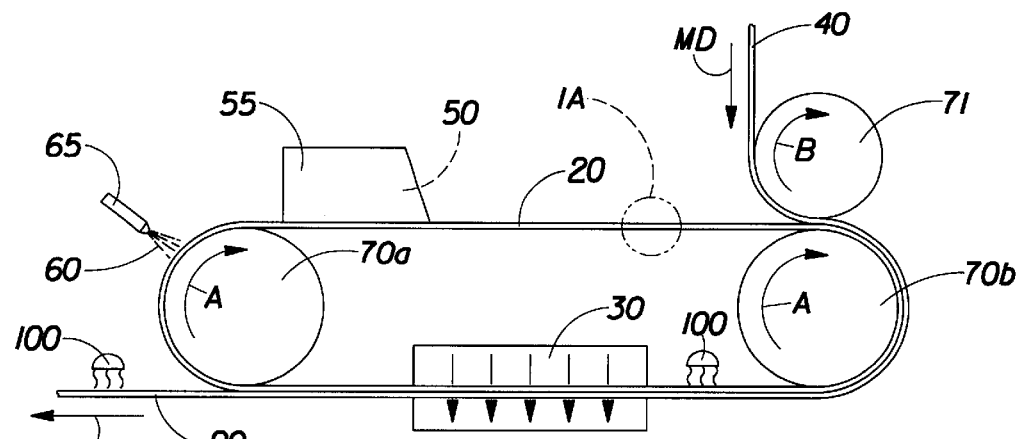
FIG. 1 is a schematic side elevational view of one embodiment of a continuous process and an apparatus of the present invention.
Figure 2:
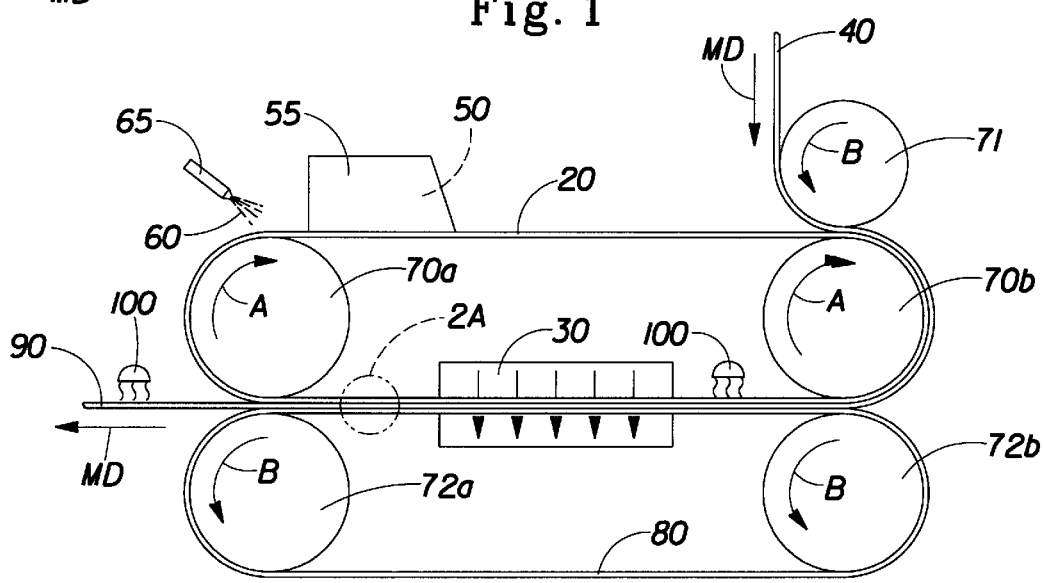
FIG. 2 is a schematic side elevational view of another embodiment of a continuous process and an apparatus of the present invention, comprising a support band.
Figure 3:
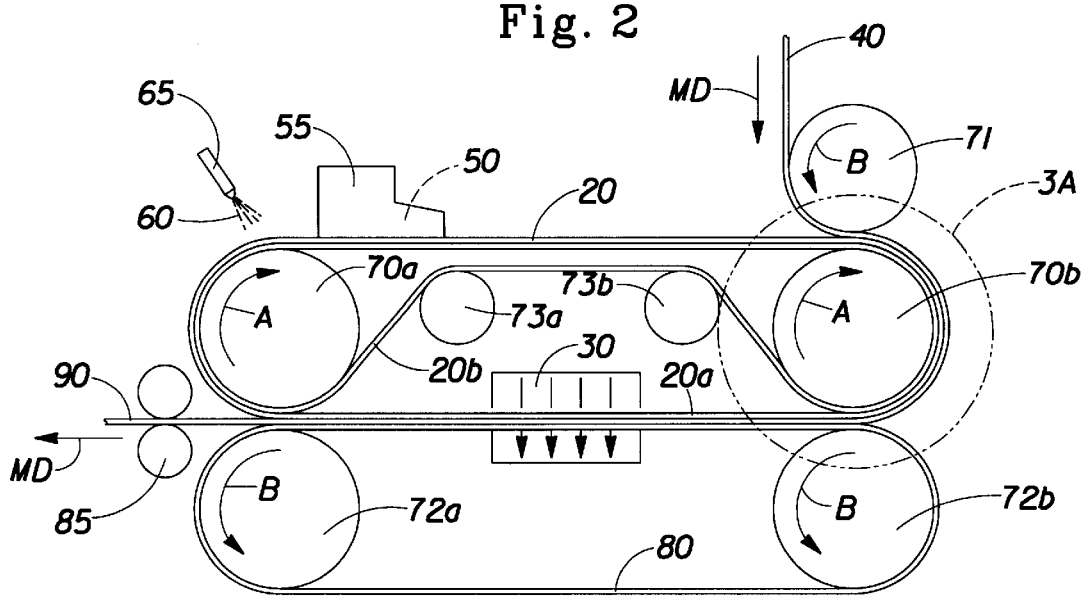
FIG. 3 is a schematic side elevational view of still another embodiment of a continuous process and an apparatus of the present invention, comprising a composite molding member formed by two endless bands.

In several embodiments of the preferred continuous process schematically shown in FIGS. 1, 2; 3, and 3A, the reinforcing structure 40 moves in the machine direction around a roll 71, and through a nip formed between the roll 71 and a roll 70b. In the embodiments of FIGS. 2 and 3, the reinforcing structure 40 further travels through a nip between the roll 70b and a roll 72b, and further through a nip between a roll 70a and a roll 72a. In the embodiments of FIGS. 2 and 3, the reinforcing structure 40 is also supported by an endless support band 80 between the nip formed between the rolls 70b and 72b and the nip formed between the rolls 70a and 72a. The support band 80 continuously travels around the support rolls 72a and 72b. In FIGS. 1, 2, and 3, the rolls 71, 72a, and 72b rotate counter-clockwise, in the direction indicated by a directional arrow "B," and the rolls 70a and 70b rotate clockwise, in the direction indicated by a directional arrow "A." In an embodiment of FIG. 4, the reinforcing structure 40 is supported, between the rolls 70a and 70b, by a roll 15 rotating counterclockwise in the direction of directional arrow "B." In an embodiment shown in FIG. 5, the reinforcing structure 40 is supported by a molding member 20 comprising a molding roll rotating clockwise (in the direction indicated by the arrow "A") and passes through a first nip formed between the molding roll and a roll 70e and a second nip formed between the molding roll and a roll 70f. The rolls 70e and 70f rotate counter-clockwise, in the direction "B."

The next step of the process of the present invention comprises providing a flowable resinous material 50. As used herein, the term "flowable resinous material" refers to a wide variety of polymeric resins and plastics that can achieve and maintain under certain conditions and/or for a certain period of time, a fluid, or liquid, state such that the resinous material 50 can be sufficiently molded into a structure having a desired configuration, and then solidify, and preferably cure, to form the framework 50a, as has been explained herein above. The flowable resinous material 50 of the present invention may comprise a material selected from the group consisting of: epoxies, silicones, urethanes, polystyrenes, polyolefines, polysulfides, nylons, butadienes, and any combination thereof.

The examples of the suitable liquid resinous material 50 comprising silicones, include, but are not limited to: "Smooth-Sil 900," "Smooth-Sil 905," "Smooth-Sil 910," and "Smooth-Sil 950." The examples of the suitable liquid resinous material 50 comprising polyurethanes, include, but are not limited to: "CP-103 Supersoft," "Formula 54-290 Soft," "PMC-121/20," "PL-25," "PMC-121/30," "BRUSH-ON 35," "PMC-121/40," "PL40," "PMC-724," "PMC-744," "PMC-121/50," "BRUSH-ON 50," "64-2 Clear Flex," "PMC-726," "PMC-746," "A60," "PMC-770," "PMC-780," "PMC-790." All the above exemplary materials are commercially available from Smooth-On, Inc., Easton, Pa., 18042. Other examples of the liquid resinous material 50 include multi-component materials, such as, for example, a two-component liquid plastic "Smooth-Cast 300," and a liquid rubber compound "Clear Flex 50," both commercially available from Smooth-On, Inc.

Photosensitive resins may also be used as the resinous material 50. The photosensitive resins are usually polymers that cure, or cross-link, under the influence of radiation, typically ultraviolet (UV) light. References containing more information on liquid photosensitive resins include Green et al., "Photocross-Linkage Resin Systems," J. MacroSci. Revs Macro Chem. C21 (2), 187–273 (1981–82); Bayer, "A Review of Ultraviolet Curing Technology", TAPPI Paper Synthetics Conf. Proc., Sep. 25–27, 1978, pp. 167–172; and Schmidle, "Ultraviolet Curable Flexible Coatings", J. of Coated Fabrics, 8, 10–20 (July, 1978). All of the preceding three references are incorporated herein by reference. Especially preferred liquid photosensitive resins are included in the Merigraph series of resins made by MacDermid, Inc., of Waterbury, Conn.

The examples of thermo-sensitive resins that can comprise the resinous material 50 of the present invention include, but are not limited to: a group of thermoplastic elastomers Hytrel® (such as Hytrel® 4056, Hytrel®7246, and Hytrel®8238); and Nylon Zytel® (such as Zytel®101L, and Zytel®132F), commercially available from DuPont Corporation of Wilmington, Del.

Preferably, the flowable resinous material 50 is provided in a liquid, or fluid, form. The present invention, however, contemplates the use of the flowable resinous material 50 which is provided in a solid form. In the latter instance, an additional step of fluidizing the resinous material 50 is required. The flowable resinous material 50 is preferably supplied to a source 55 (FIGS. 1, 2, 3, 4, and 5) which provides for the proper conditions (such as, for example, temperature) to keep the flowable resinous material 50 in a fluid state. As used herein, the terms "fluid" and "liquid" refer to a condition, state, or phase, of the resinous material 50, in which condition the resinous material 60 is capable of flowing and which allows the resinous material 50 to be deposited onto or into a surface having a three-dimensional pattern therein, such that the resinous material 50 substantially conforms to a three-dimensional pattern of the patterned surface. If thermoplastic or thermosetting resins are used as the resinous material 50, typically, a temperature slightly above the melting point of the resinous material 50 is desired to maintain the resin in a fluid state. The resinous material 50 is considered to be at or above the "melting point" if the resinous material 50 is wholly in the fluid state. The suitable source 55 is a trough schematically shown in several drawings of the present application. The trough may have a closed end bottom and closed side walls and outboard side wall. The inboard side wall of the trough may be open allowing the flowable resinous material 50 disposed therein to freely contact a molding member 20. If the resinous material comprises a thermoplastic resin, the source 55 and the molding surface 21 are preferably heated to prevent premature solidification of the liquid resinous material 50.

The next step of the process comprises providing a molding member 20, which is fluid-permeable. As used herein, the "molding member" 20 is a structure designed to receive the fluid resinous material 50 and then transfer the resinous material 50 to the reinforcing structure 40, preferably in a substantially pre-selected pattern. The molding member 20 is "fluid-permeable" because at least a portion or portions of the molding member 20 allow(s) fluids, such as water and air, to pass through the molding member 20 in at least one direction. More specifically, the term "fluid-permeable," in the context of the molding member 20, refers to a condition of at least a portion or portions of the molding member 20, which condition allows the portion or portions to provide fluid communication therethrough, i.e., between the opposite sides 21 and 22 of the molding member 20. In accordance with the present invention, at least partial fluid-permeability of the molding member 20 must be sufficient to allow one to effectively apply a fluid pressure differential through the molding member 20 such as to transfer the resinous material 50 from the molding member 20 to the reinforcing structure 40, as will be explained in greater detail below.

In the preferred continuous process, the molding member 20 may comprise a variety of different embodiments. In embodiments shown in FIGS. 1–4, the molding member 20 comprises an endless molding band, while in an embodiment shown in FIG. 5, the molding member 20 comprises a rotatable molding roll. Regardless of its embodiment, the molding member 20 has a molding surface 21 preferably having a three-dimensional pattern, and structured and designed to receive the flowable resinous material 50 such that the flowable resinous material 50 substantially conforms to the three-dimensional pattern. Preferably the molding surface 21 comprises a preselected pattern of fluid-permeable molding pockets 25, as best shown in FIGS. 3A, 5, 6, and 8. As used herein, the "molding surface" 21 is a generic term referring to all surfaces of the molding member 20, including an inherent surface, such as an external (the most elevated) surface of the molding band or an external (corresponding to a greater diameter) circumference of the molding roll, as well as inner surfaces of the pockets 25. The molding surface 21 is a surface onto (or into) which the fluid resinous material 50 is deposited.

Figure 4:
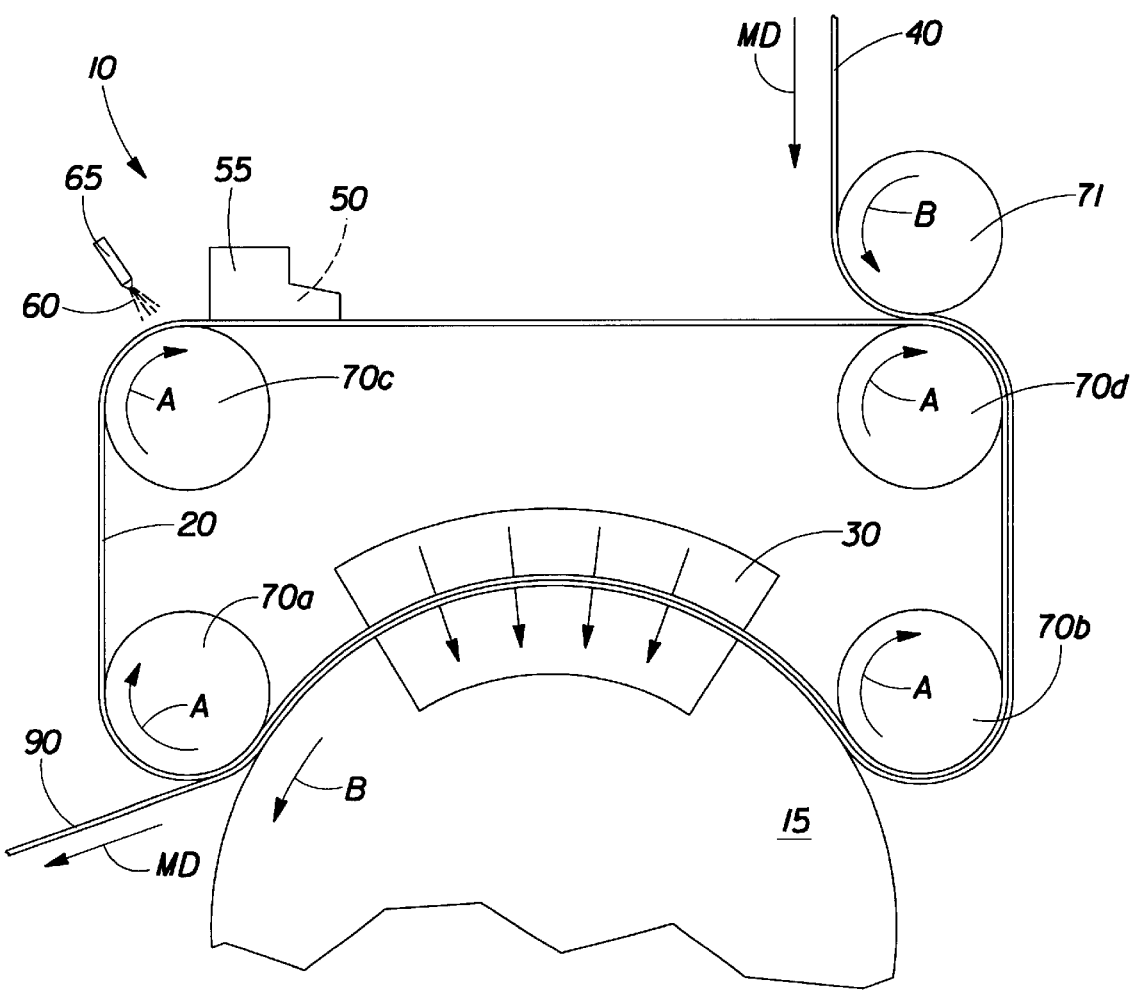
FIG. 4 is a schematic side elevational view of another embodiment of the process and the apparatus of the present invention, showing a molding member supported by a roll.
Figure 5:
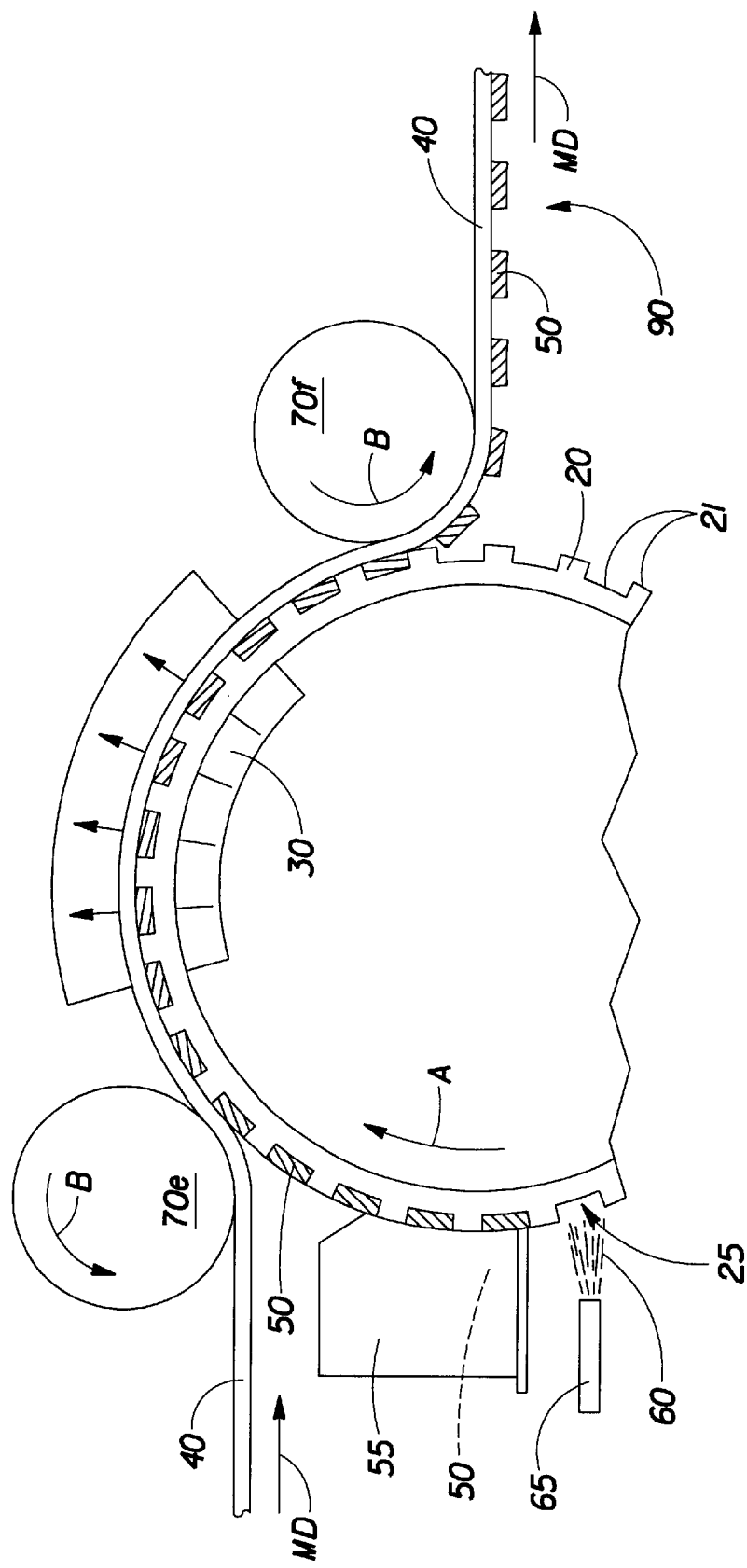
FIG. 5 is a schematic side elevational view of another embodiment of the process and the apparatus of the present invention, showing a molding member comprising a roll.

In a preferred continuous process of the present invention, the molding member 20 continuously moves at a transport velocity thereby carrying the resinous material 50. One skilled in the art will readily appreciate that in the embodiment (FIG. 5) comprising the rotatable molding roll, the transport velocity comprises a surface velocity measured at one of the circumferences of the molding surface 21. In FIG. 5, a direction of rotation of the molding roll is indicated by a directional arrow "A." In the embodiments of FIGS. 1, 2, 3, and 4, the molding member 20, comprising a molding band, is supported by at least a pair of support rolls 70a and 70b, rotatable clockwise (a direction of rotation of the support rolls is indicated by a directional arrow "A"). In FIG. 4, the molding band is supported also by support rolls 70c and 70d.

As used herein, the term "molding pockets" 25 refers to a pattern of depressions (or cavities), or orifices in the molding surface 21, which are designed to receive the fluid resinous material 50 from the source 55 and then to deposit the fluid resinous material 50 onto the reinforcing structure 40 in a predetermined pattern. The molding pockets 25 may comprise a substantially continuous pattern in the molding surface 21, as best shown in FIG. 6; in this instance, the resinous material 50 is transferred onto the reinforcing structure 40 in a substantially continuous pattern. As used herein, a pattern is said to be "substantially" continuous to indicate that minor deviations from absolute continuity may be tolerated, as long as these deviations do not adversely affect the process of the present invention and the performance and desired qualities of the final product—the papermaking belt 90. FIGS. 7 and 7A show an exemplary embodiment of the papermaking belt 90 having a substantially continuous resinous framework 50a, made by using the continuous pattern of the molding pockets 25.

Figure 9A:
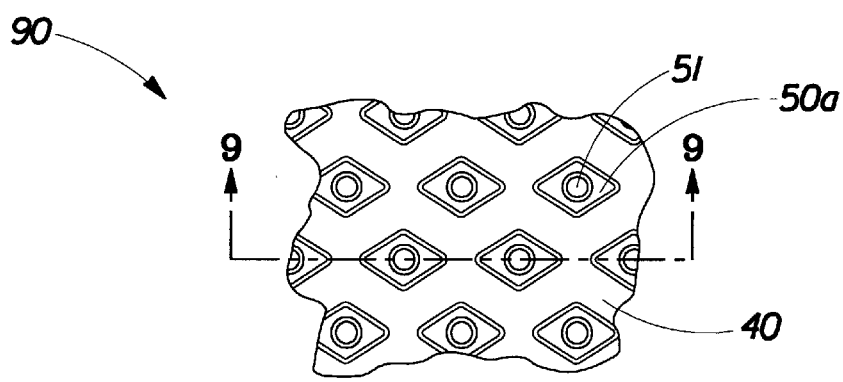
FIG. 9A is a schematic top plan view taken along lines 9A—9A of FIG. 9.

Alternatively or additionally, the molding pockets 25 may comprise a pattern of discrete depressions, or orifices. In the latter instance, the resinous material 50 is transferred from the molding pockets 25 to the reinforcing structure 40 in a pattern comprising a plurality of discrete protuberances. An exemplary papermaking belt 90 having the resinous framework 50a comprising a plurality of discrete protuberances outwardly extending from the first side 41 of the reinforcing structure 40, is schematically shown in FIGS. 9, and 9A. A pattern (not shown) comprising a combination of the substantially continuous molding pockets and the discrete molding pockets, as well as a semi-continuous pattern, is also contemplated in the present invention.

Figure 1A:
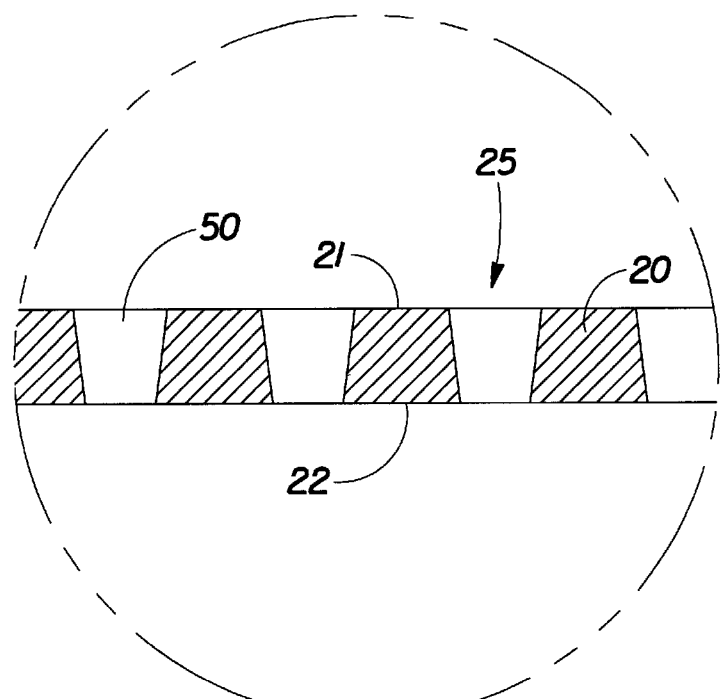
FIG. 1A is a schematic cross-sectional side view of a fragment 1A of FIG. 1, and showing one embodiment of a molding member.
Figure 2A:
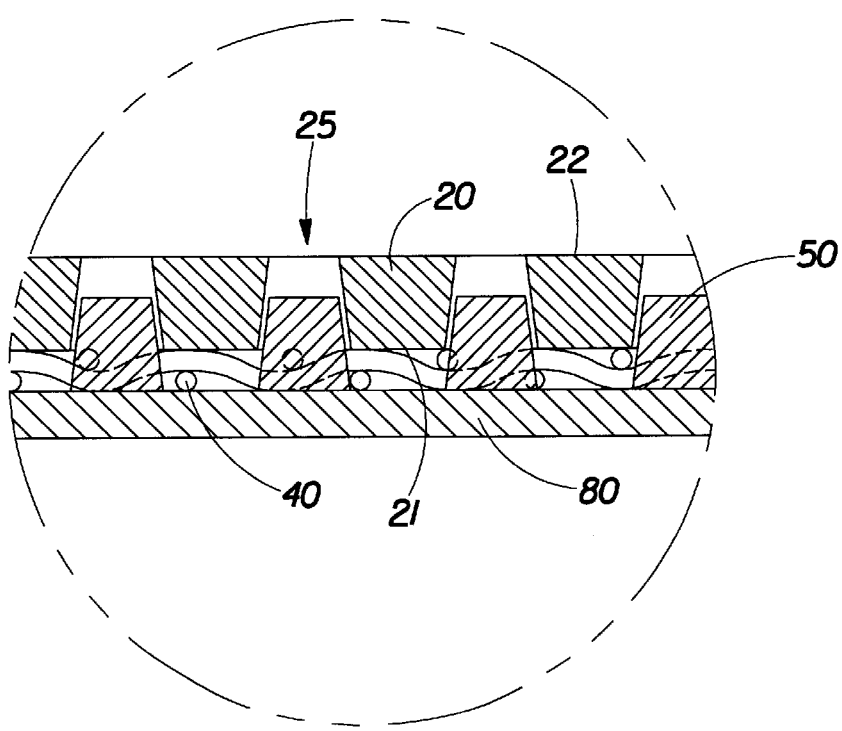
FIG. 2A is a schematic cross-sectional side view of a fragment 2A of FIG. 2.
Figure 3A:
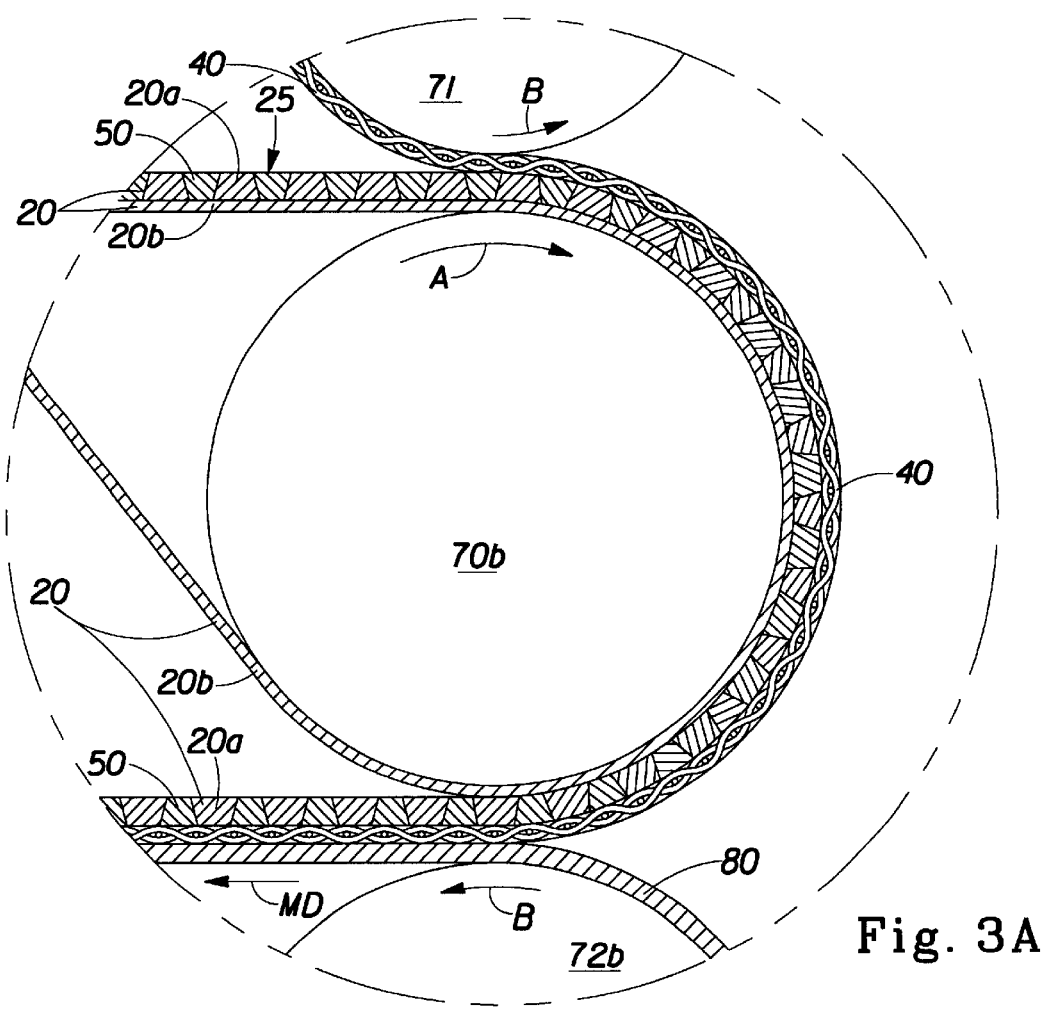
FIG. 3A is a schematic cross-sectional side view of fragments 3A of FIG. 3, showing the composite molding member formed by two endless bands.

In some embodiments, the molding pockets 25 may comprise orifices extending through the molding member 20, between the mutually opposed surfaces 21 and 22, as shown in FIGS. 1A and 2A. In one preferred embodiment shown in FIGS. 3 and 3A, the molding member 20 comprises an endless composite band formed by a first band 20a and a second band 20b. The first band 20a has a plurality of orifices extending through the thickness of the first band 20a. These orifices form the molding pockets 25. In the continuous process of FIG. 3, a portion of the first band 20a is in a contacting face-to-face relationship with a portion of the second band 20b such that the second band 20b "closes" the orifices of the first band 20a at one side of the first band 20a, as best shown in FIG. 3A. When the flowable resinous material 50 is deposited into the orifices of the first band 20a, the second band 20b prevents the resinous material 50 from leaking through the orifices of the first band 20a. When the reinforcing structure 40 is juxtaposed with the first band 20a (FIG. 3A), the resinous material 50 is within the orifices of the first band 20a and at the same time between the reinforcing structure 40 and the second band 20b. Later in the process, the first band 20a and the second band 20b separate, while the reinforcing structure 40 preferably continues to be closely associated with the first band 20a. A fluid pressure differential now may be effectively applied to the resinous material 50 to transfer the resinous material 50 from the orifices of the first band 20a to the reinforcing structure 40, as will be explained in greater detail herein below. In the embodiment of FIGS. 3 and 3A, the second band 20b may be fluid-permeable or non-fluid-permeable. In the latter instance, fluid-permeability of the molding member 20 is achieved only after the first band 20a and the second band 20b have separated.

A less preferred embodiment of the molding member 20 is possible and is shown in FIGS. 1A and 2A, in which embodiment the molding member 20 comprises a single band having orifices therethrough. In this instance, the viscosity of the fluid resinous material 50, dimensions and shape of the orifices through the molding band 20, a time during which the resinous material 50 is within the orifices, and other relevant parameters of the process should be selected such as to prevent the fluid resinous material 50 from prematurely (i. e., before the molding band 20 is juxtaposed with the reinforcing structure 40) leaking through the orifices of the molding member 20. One skilled in the art will understand that the foregoing parameters are interdependent and individual for a particular process and apparatus of the present invention.

Figure 2B:
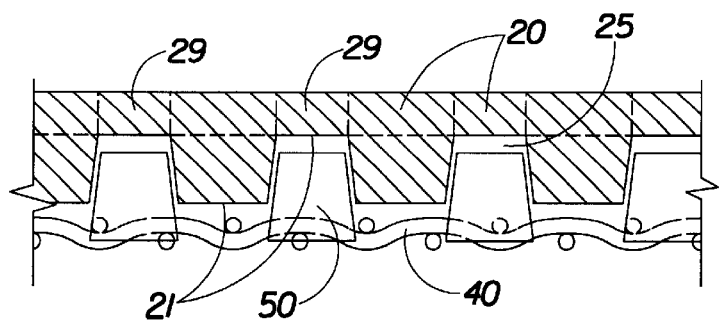
FIG. 2B is a schematic cross-sectional side view similar to that of FIG. 2A, and showing another embodiment of the molding member.
Figure 2C:
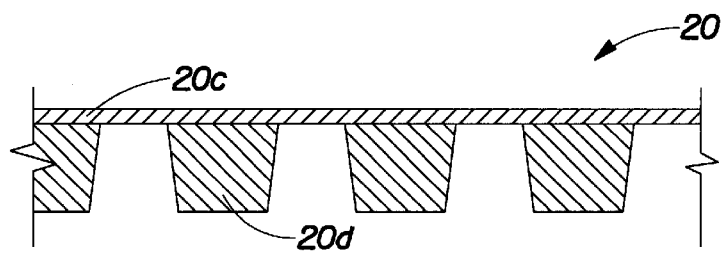
FIG. 2C is a schematic cross-sectional side view of another embodiment of the molding member.

FIG. 2B shows another embodiment of the molding member 20. In FIG. 2B, the molding member 20 has the patterned molding surface 21, as has been explained above. The molding pockets 25 are structured to receive the flowable resinous material 50 therein. In FIG. 2B, at least portions 29 of the molding member are fluid-permeable. The fluid-permeable portions 29 are the portions that correspond to the molding pockets 25 in the direction of the desirable application of the fluid pressure differential for the purposes of transferring the resinous material 50 from the molding member 20 to the reinforcing structure 40. FIG. 2C shows another embodiment of the molding member 20 comprising a relatively thin fluid-permeable support element 20c and a patterned element 20d joined to the support element 20c. Portions of the support element 20c, which portions do not have corresponding portions of the patterned element 20d provide fluid-permeability therethrough. The patterned element 20d may or may not be fluid-permeable.

The fluid-permeable molding member 20 (or fluid-permeable portions of the molding member 20) can be made using a variety of suitable fluid-permeable materials known in the art. The examples include but are not limited to: fluorocarbon polymers, such as, for example, polytetrafluoroethylene (or PTFE, also known as Teflon®); GoreTex® commercially available from W. L. Gore & Associates, Inc. of Newark, Del.; microporous materials, commercially available from Millipore Corp. of Bedford, Mass.; micropore tapes made by 3M Corporation of St. Paul, Minn.; various sintered materials, such as, for example, Dynapore® porous stainless steel wire mesh laminates made by Martin Kurtz & Co., Inc. of Mineola, N.Y.; and sintered alloys available from National Sintered Alloys, Inc. of Clinton, Conn.; and woven metal wire cloths commercially available from Haver & Boecker of Oelde, Germany and Haver Standard India Pvt. Ltd. (HAST) of Bombay, India.

Figure 8:
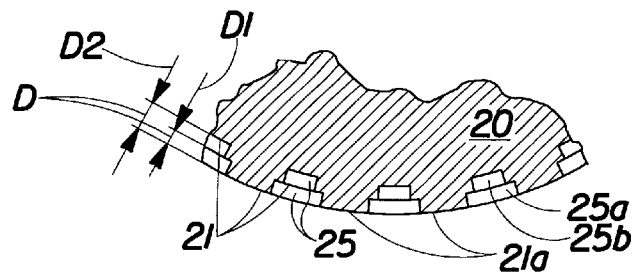
FIG. 8 is a schematic partial cross-sectional view of one exemplary embodiment of the molding member of the present invention, comprising a plurality of molding pockets having differential depths.
Figure 8A:
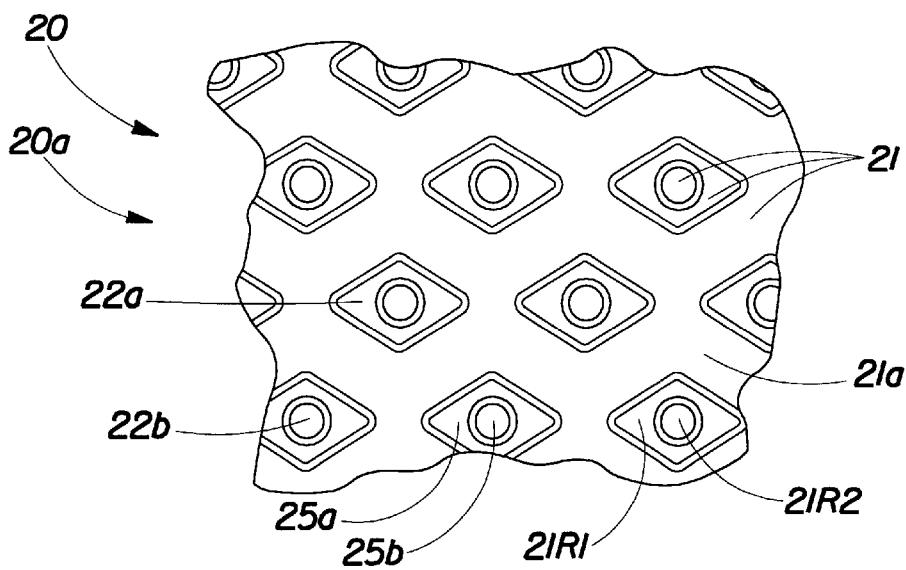
FIG. 8A is a schematic planar representation of a plan view taken along lines 8A—8A of FIG. 8.

The molding pockets 25 have at least one depth designated herein by a symbol "D" (FIG. 8). The depth D generally defines (but not necessarily is equal to) a thickness of the resinous material 50 deposited from the molding pockets 25 onto the reinforcing structure 40. As used herein, the term "depth" of the molding pocket(s) 25 indicates an extent of the geometrically-distinct depression(s) into the molding member 20. As an example, FIGS. 8 and 8A show a fragment of the molding member 20, comprising a molding roll, having a plurality of discrete molding pockets 25. An inherent portion 21a of the molding surface 21 is that portion of the roll's external circumference which is not affected by the molding pockets 25, typically a portion of the roll's circumference corresponding to the roll's greater diameter. In FIGS. 8 and 8A, the inherent portion 21a is a continuous portion of the external circumference encompassing the discrete molding pockets 25. FIGS. 8 and 8A also show that each molding pocket comprises two geometrically-distinct depressions, a first depression 25a (relatively larger) having an exemplary shape of a rhombus, and a second depression 25b (relatively smaller) having an exemplary shape of a circle, as best shown in FIG. 8A. The first depression 25a has the first depth D1, and the second depression 25b has the second depth D2 greater than the first depth D1, or—to put it differently—each of the molding pockets 25 shown in FIG. 8 has two depths, the first depth D1 and the second depth D2.

FIGS. 9 and 9A schematically illustrate the belt 90 which is made by using the molding member 20 shown in FIGS. 8 and 8A. The belt 90 has the framework 50a comprising a plurality of discrete protuberances, each having two heights": a first height hi corresponding (but not necessarily equal) to the first depth D1 of the first depressions 25a, and a second height h2 corresponding (but not necessarily equal) to the second depth D2 of the second depressions 25b. It should be understood that the foregoing examples are intended only for the illustrative purposes, and not for the purposes of limitation. Virtually an unlimited number of shapes and their combinations and permutations of the molding pockets 25 having differential depths may be used in the present invention.

While FIGS. 8 and 8A show the geometrically-symmetrical molding pockets 25, it is to be understood that geometrically-asymmetrical configurations (in plan view as well as in a cross-section) may be used if desired (not shown). "Angled" configurations of the molding pockets 25 may be used to produce the "angled" pattern of the resinous framework 50a, as explained herein above. Furthermore, embodiments (not shown) may exist of the molding pockets 25 in which the relationship between a specific depth D and a geometrically-distinct configuration is not apparent, or even impossible to establish. The process of the present invention allows one advantageously to create almost any desired shape of the resinous framework 90 by providing the correspondingly-shaped molding surface 21.

The next step in the process of the present invention comprises depositing the flowable resinous material 50 onto or into the molding member 20. Preferably, the flowable resinous material 50 is deposited into or onto the molding member 20 in a substantially predetermined pattern. It is said that the flowable resinous material 50 is deposited "into" or "onto" the molding member 20 to take into account that, according to the present invention, the molding member 20 may have a variety of embodiments of the molding surface 21 (defined herein above) which receives the flowable resinous material 50. The use of the conjunctive "into or onto" is intended to reflect the fact that the molding surface 21 may be substantially flat, in which instance the flowable resinous material 50 is deposited "onto" the molding member 20, or may preferably have a three-dimensional pattern comprising molding pockets 24 therein (FIG. 8), in which instance the flowable resinous material may be deposited "into" the molding member 20. It also is intended to reflect possible different methods of depositing the flowable resinous material 50. For example, the flowable resinous material 50 may be deposited onto the molding surface 21 having the molding pockets 24, and then an excess of the resinous material 50 is removed by wiping or any other technique known in the art. Alternatively or additionally, the resinous material 50 may be deposited directly into the molding pockets 24 of the molding surface 21. One skilled in the art should also understand that in the present context the disjunctive "onto or into" includes the conjunctive "onto and into."

Generally, in a preferred continuous process, the step of depositing the flowable resinous material 50 comprises first, contacting the molding surface 21 with the flowable resinous material 50, and then removing excess of the resinous material 50 from the molding surface 21 as the molding surface 21 is moving. Preferably, the excess of the flowable resinous material 50 is returned to the source (trough, for example) 55 of the resinous material 50. By doing so, one can significantly reduce, and even virtually eliminate, waste of the resinous material 50. Any suitable depositing means known in the art may be used in the apparatus 10 of the present invention to perform this step. As used herein, the term "depositing means" refers to anything capable of transferring the fluid resinous material 50 from a bulk quantity to the molding surface 21 in required dosage, such as, for example, a though capable of communicating with the molding member, a nozzle, an extruder, and other suitable means. The term "deposit" refers to a transfer of the fluid resinous material 50 from the bulk form (provided, for example, in the trough 55, described herein above) and dose the fluid resinous material 50 onto or into the molding surface 21 and/or into the molding pockets 25, such that the fluid resinous material 50 fills the molding pockets 25 in a substantially uniform manner. Removing the excess of the resinous material 50 from the molding surface 21 may be accomplished by wiping and/or scraping the excess material from the molding surface 21, or any other methods known in the art.

The next step is highly preferred and is necessary in the continuous process, and comprises continuously moving the molding member 20 and the reinforcing structure 40 at a transport velocity such that at least a portion of the reinforcing structure 40 is in a face-to-face relationship with at least a portion of the molding member 20, particularly, the molding surface 21 having the flowable resinous material associated therewith. Preferably, the portion of the reinforcing structure 40 facing the molding surface 20 contacts the molding surface 20 for a predetermined period of time. This predetermined period of time should preferably be sufficient for the resinous material 50 to transfer from the molding member 20 to the reinforcing structure 40 under a fluid pressure differential, as explained below.

According to the present invention, the resinous material 50 is maintained in a sufficiently fluid state prior to its deposition onto or into the molding member 20. Preferably, the resinous material 50 should be fluid enough to uniformly fill the molding pockets 25. In some embodiments, solidification of the resinous material 50 may begin right after the resinous material 50 has filled the molding pockets 25. A highly preferred step of pre-solidification may be required to allow the resinous material 50 to sufficiently retain its shape during the following step of applying a pressure differential to the resinous material 50 and transferring the resinous material 50 from the molding member 20 to the reinforcing structure 40. As used herein, the "pre-solidification" refers to partial solidification of the resinous material 50 such that the resinous material 50 is capable of sufficiently retaining the desired shape, and yet soft enough to be effectively joined to the reinforcing structure 40. A degree of pre-solidification depends upon the type of the resinous material 50 and its viscosity, relative geometry of the molding surface 21 and the reinforcing structure 40, the time during which the resinous material 50 is being transferred to the reinforcing structure 40, and other relevant parameters of the process and the apparatus of the present invention. A curing apparatus 100 may be used for the pre-solidification purposes as schematically shown in FIGS. 1 and 2.

After the resinous material 50 associated with the molding member 20 has preferably been pre-solidified, the next step comprises applying the fluid pressure differential to the flowable resinous material 50 to transfer the resinous material 50 from the molding member 20 to the reinforcing structure 40 and to cause the resinous material 50 to join the reinforcing structure 40. According to the present invention, an embodiment is contemplated in which the resinous material 50 disposed in the molding pockets 25 pre-solidifies such that the outer surface of the resinous material 50, which is in direct contact with the inside surface of the molding pockets 25 solidifies first, while the rest of the resinous material 50 disposed in the molding pockets 25 is still in a substantially fluid state. Then, the outer surface of the resinous material 50, which is at least partially solidified, functions as a shell for the rest of the resinous material 50 which is still at least partially fluid. This embodiment may be particularly beneficial in the process using the reinforcing structure 40 having void spaces therethrough, such as, for example, a woven reinforcing structure 40. In this embodiment, when the fluid pressure differential is applied to the partially-solidified resinous material 50, the resinous material 50 is "pushed" through the yarns of the reinforcing structure 40, which yarns form its first side 41, and into the reinforcing structure 40, without prohibitively distorting the shape of the resinous material 50, for the partially-solidified "shell" preserves the shape of the resinous material 50 being deposited to the reinforcing structure 40.

Typically, although not necessarily, the resinous material 50 does not merely attach to the reinforcing structure 40, but has to wrap around structural elements of the reinforcing structure 40 (such as, for example, individual yarns in a woven reinforcing structure 40), to adequately lock on them, thereby at least partially encasing some of them. The fluid pressure differential forces the resinous material 50 to penetrate between the structural elements of the reinforcing structure 40.

Preferably, the time during which the molding member 20 faces (and referably contacts) the reinforcing structure 40 should be sufficient for the resinous material 50 to transfer, under application of the fluid pressure differential, from the molding member 20 onto the reinforcing structure 40. More preferably, this time should be sufficient for the resinous material 50 to join, at least partially, the reinforcing structure 40, preferably in a desired pattern (substantially corresponding to the pattern of the molding surface 21). It is said that the resinous material 50 joins the reinforcing structure 40 preferably in a pattern "substantially" corresponding to the pre-selected pattern of the molding surface 21 to take into account that minor deviations from, or distortions of, the absolutely correct pattern formed on or in the molding member 20 are tolerable, as long as these deviation or distortions do not substantially interfere with the performance of the belt being constructed. It should also be understood that the pattern of the molding surface 21 may be designed such as to compensate for the potential distortions of the pattern of the resinous material 50 during the transfer of the resinous material 50 from the molding member 20 to the reinforcing structure. For example, assuming that during the step of transferring, in some embodiments the resinous material 50 may expand laterally while losing in height, the dimensions of the molding pockets 25 may be made smaller than the desired corresponding dimensions of the resinous framework 50a.

A means 30 for creating and applying the fluid pressure differential to the resinous material 50 are well known in the art, and include, by way of illustration, and not limitation such devices as: a vacuum apparatus, a fan, a hydraulic pump, and the like. The hydraulic pump may be used to create the fluid pressure differential with such liquid media as oil and water.

As used herein, the "vacuum apparatus" is a generic term referring to any device capable of creating a pressure differential between the mutually opposite sides 21 and 22 of the molding member 20. It should be pointed out that the vacuum apparatus includes devices designed to create a "positive" pressure and devices designed to create a "negative" pressure. As used herein, the "positive" pressure is the pressure which is greater than an ambient, i. e., atmospheric, pressure; and the "negative" pressure is the pressure which is less than the atmospheric pressure. For example, if the resinous material 50 comprises a thermo-polymer, gas may be used to create a positive pressure. As the gas expands, it cools, thereby cooling and solidifying the resinous material 50. Gases containing free radical initiators could be used to cure certain types of the resinous material 50.

In some embodiments it may be desirable to control the application of the fluid pressure differential to the resinous material 50 such as to avoid a sudden application of the pressure which may prohibitively distort the pattern of the resinous material 50 being formed on or in the molding member 20. For example, a rate of application of the fluid pressure differential may be apportioned to gradually or discretely increase as the molding member 20 and the reinforcing structure 40 travel in the machine direction. Alternatively or additionally, a surface supporting the reinforcing structure 40 in the area of application of the fluid pressure differential, if applicable, may be textured to provide a leakage between the supporting surface and the reinforcing structure 40. For illustration purposes only, in FIGS. 2, 3, and 3A, such supporting surface comprises a surface of the support band 80; and in FIG. 4 the supporting surface comprises a surface of the support roll 15. These and other methods of controlling the rate of application of the fluid pressure differential to the resinous material 50 are described in greater detail in commonly assigned U.S. Pat. No. 5,776,311, issued Jul. 7, 1998, to Trokhan et al., the disclosure of which is incorporated herein by reference for the purpose of disclosing various methods of controlling the rate of application of the fluid pressure differential to the resinous material 50 associated with the molding member 20.

Preferably, a surface energy of the molding surface 21 associated with the resinous material 50 is less than a surface energy of the reinforcing structure 40. Several ways exist of creating a surface energy differential between the molding surface 21 and the reinforcing structure 40. A material comprising the molding surface 21 may inherently have a relatively low surface energy, or can be treated to lower its surface energy. Alternatively or additionally, the molding surface 21 can be treated with a release agent 60 prior to the step of depositing the resinous material 50 onto or into the molding member 20. Examples of the release agent 60 include but are not limited to: "Ease Release™," "Permarelease™," "Aqualease™," and Actilease™," available from Smooth-On, Inc. A source 65 of the release agent 60 is schematically shown as a spraying nozzle in several drawings. It is to be understood, however, that the release agent 60 may be also brushed or wiped onto the molding surfaces, in which instances the source 65 may comprise a brush, a trough, or any other suitable device known in the art. In some applications, it might be necessary to apply two or more coats of the release agent 60 to the molding surface 21. In some embodiments in which the molding surface has microscopic pores therein, it may be desirable to heat the release agent 60 or/and the molding surface 21 to facilitate penetration of the release agent 60 into the molding surface 21 thereby sealing the pores before depositing the resinous material 50 to the molding surface 21.

If desired, the molding member 20 may be structured to have a pattern of recesses 26 (FIG. 6) for receiving the reinforcing structure 40 therein. Then, when the reinforcing structure 40 is juxtaposed with the molding member 20, the reinforcing structure 40 is at least partially recessed in the molding surface 21. The reinforcing structure 40 may be completely recessed within the recesses 26 of the molding surface 21, in which instance the recesses 26 have a depth not less than, and preferably equal to, the thickness h of the reinforcing structure 40. Alternatively, the reinforcing structure 40 may be only partially recessed within the recesses 26, in which instance the depth of the recesses 26 is less than the thickness h of the reinforcing structure 40. In FIG. 6, the pattern of the molding pockets 25 for receiving the flowable resinous material 50 is superimposed with the pattern of recesses 26 for receiving the reinforcing structure 40. In FIG. 6, a portion of the molding surface 21, which portion provides support for the reinforcing structure 40 is designated as 21S; and a portion of the molding surface 21 which provides support for the resinous material 50 is designated as 21R. Preferably, a step of registering the reinforcing structure 40 with the recesses 26 is performed.

The reinforcing structure 40 may also be recessed (not shown), at least partially, in the support band 80 (FIGS. 2, 3, and 3A) or in the support roll 15 (FIG. 4). In this instance, a distance "Z" may be formed between the second side 42 of the reinforcing structure 40 and the bottom side 52 of the resinous framework 50 when the belt 90 is formed, as shown in FIG. 6A. In a through-air-drying papermaking belt, the distance "Z" creates a leakage between the belt's backside surface 92 contacting the papermaking equipment (such as, for example, a vacuum box or a pick-up shoe) and the belt-contacting surface of such equipment. The leakage mitigates a sudden application of vacuum pressure to the paper web disposed on the belt 90, and thus reduces, if not completely eliminates, so-called pinholing. One skilled in the art will recognize that the term "pinholing" refers to formation of pin-sized holes, or "pinholes," in the web being dewatered, as a result of the sudden application of the vacuum pressure to the web and consequent separation of a certain amount of fibers from the web. Some of the fibers may completely pass through the papermaking belt, thereby causing, in addition to pinholing, clogging of the vacuum dewatering machinery with the papermaking fibers.

One skilled in the art will appreciate that the pattern of the resinous material 50 transferred from the molding member 20 onto the reinforcing structure 40 reflects the pattern of the molding surface 21. Thus, if the molding surface 21 comprises a substantially continuous pattern of the molding pockets 25, as shown in FIG. 6, the resinous material 50 is transferred onto the reinforcing structure 40 in a substantially continuous pattern. If, on the other hand, the molding surface 21 comprises a plurality of discrete molding pockets 25, as best shown in FIGS. 8 and 8A, the resinous material 50 is transferred onto the reinforcing structure 40 in a pattern comprising a plurality of resinous protuberances, FIGS. 9 and 9A.

The next step of the process of the present invention comprises solidifying the resinous material 50 joined to the reinforcing structure 40. As used herein, the term "solidification" and derivations thereof refer to a process of altering a fluid to a solid, or partially solid, state. Typically, solidification involves a phase change, from a liquid phase to a solid phase. The term "curing" refers to a solidification in which cross-linking occurs. For example, photosensitive resins may be cured by UV radiation, as described in commonly assigned U.S. Pat. Nos. 5,334,289; 5,275,700; 5,364,504; 5,098,522; 5,674,663; and 5,629,052, all of which are incorporated herein by reference. The thermoplastic and thermo-setting resins require a certain temperature for solidification. Preferably, the step of solidification comprises curing of the resinous material 50.

As has been explained above, preferably the process of pre-solidification of the resinous material 50 may begin as early as immediately after the fluid resinous material 50 has been deposited onto or into the molding member 20. Preferably, solidification continues while the reinforcing structure 40 and the molding surface 21 are in face-to-face relationship. A method of solidifying the resinous material 50 depends upon its nature. If a thermoplastic or thermo-setting resin is used, solidifying comprises cooling the resinous material 50 transferred onto the reinforcing structure 40. Photopolymer resins may be cured by a process of curing described in commonly assigned U.S. Pat. Nos. 4,514,345; and 5,275,700, incorporated herein by reference and referred to above. The resinous material 50 comprising multi-component resins or plastics may solidify naturally, during a certain predetermined period of time, by virtue of being mixed together.

As an example, FIGS. 1 and 2 schematically show the curing apparatus 100 juxtaposed with the second side 42 of the reinforcing structure 40. Depending on the type of the resinous material 50, the examples of the curing apparatus 100 include, but are not limited to: a heater for increasing cross-linking reaction rates or condensing rates for condensing polymers; a cooler for solidifying thermoplastics; various apparatuses providing an infra-red curing radiation, a microwave curing radiation, or a ultra-violet curing radiation; and the like. Commonly assigned patent application, Ser. No. 08/799,852, entitled "Apparatus for Generating Parallel Radiation For Curing Photosensitive Resin" filed in the name of Trokhan on Feb. 13, 1997; and commonly assigned patent application, Ser. No. 08/858,334, entitled "Apparatus for Generating Controlled Radiation For Curing Photosensitive Resin" filed in the names of Trokhan et al. on Feb. 13, 1997 are incorporated herein by reference for the purpose of showing several embodiments of the curing apparatus 100 which can be used for solidifying the resinous material 50 comprising a photosensitive resin.

Optionally, a step of controlling the caliper H (FIG. 7) of the belt 90 may be provided in the process of the present invention. The caliper H may be controlled to a pre-selected value by controlling an overburden OB (FIG. 7), i. e., a distance between the top side 51 of the resinous framework 50 and the first side 41 of the reinforcing structure 40. Also, the caliper H may be controlled by controlling the depth of recesses 26 in the molding member 20 or the depth of the recesses in the supporting surface for the reinforcing structure 40. Another way of controlling the caliper H comprises changing the thickness of the resinous material 50 after the resinous material 50 has been transferred from the molding member 20 to the reinforcing structure 40, and after the resinous framework has been at least partially formed. For example, the thickness of the resinous material 50 can be adjusted by mechanical means known in the art. FIG. 3 schematically shows a caliper-controlling device 85 comprising two mutually-juxtaposed rolls forming a clearance therebetween. By adjusting the clearance between the rolls of the device 85, one can control the caliper of the belt 90 being constructed. Alternatively or additionally, the caliper-controlling device may comprise a rotating sanding roll, a planing knife, a laser, or any other means known in the art and suitable for the purpose of controlling the caliper of the belt 90.

The process and the apparatus of the present invention significantly reduces the amount of the flowable resin that is required to be used in constructing he belt 90, and thus provides an economic benefit. The prior art's methods of making the belt, using a photosensitive resin and a curing radiation, requires application of a coating of the photosensitive resin to the reinforcing structure, curing selected portions of the resinous coating, and then removing (typically, washing out) uncured portions of the resinous coating. The amount of the resin being washed out is about from 25% to 75% relative to the amount of the entire resinous coating. In the present invention, the exact amount of the resinous material 50, which is required for the resinous framework 50*a* may be formed on or in the molding member 20. The excess of the resinous material 50 deposited onto the external (inherent) surface 21*a* of the molding member 20 may be (and preferably are) easily recycled, by any means known in the art, into the source 55 of the resinous material 50, thereby completely eliminating waste of the resinous material 50. Furthermore, the process and the apparatus of the present invention allows one to create virtually unlimited number of three-dimensional patterns of the resinous framework 50*a*.

What is claimed is:

1. A process for making a papermaking belt comprising a reinforcing structure and a resinous framework joined thereto, the process comprising the steps of:
   (a) providing a reinforcing structure having a first side, a second side opposite to the first side, and a thickness formed therebetween;
   (b) providing a flowable resinous material;
   (c) providing a molding member, the molding member being at least partially fluid-permeable;
   (d) depositing the flowable resinous material onto or into the molding member;
   (e) juxtaposing the reinforcing structure with the molding member;
   (f) applying a fluid pressure differential to the flowable resinous material associated with the molding member thereby transferring the flowable resinous material from the molding member to the reinforcing structure and causing the flowable resinous material and the reinforcing structure to join together; and
   (g) solidifying the resinous material thereby forming the resinous framework joined to the reinforcing structure, whereby the papermaking belt is formed.

2. The process according to claim 1, wherein in the step (d) the flowable resinous material is deposited onto or into the molding member in a preselected pattern.

3. The process according to claim 1, further comprising a step of pre-solidifying the flowable resinous material prior to the step (f) such that the resinous material sufficiently retains the pre-selected pattern during the step (f).

4. The process according to claim 2, wherein in the step (f) the flowable resinous material is transferred from the molding member to the reinforcing structure substantially in the pre-selected pattern.

5. The process according to claim 4, wherein in the step (f) the flowable resinous material penetrates the thickness of the reinforcing structure.

6. The process according to claim 1, wherein the step (d) comprises:
   contacting the molding member with the flowable resinous material; and
   removing excess of the flowable resinous material from the molding member.

7. The process according to claim 1, further comprising a step of continuously moving the molding member and the reinforcing structure at a transport velocity such that at least a portion of the reinforcing structure is in a face-to-face relationship with at least a portion of the molding member.

8. The process according to claim 1, wherein in the step (e) the reinforcing structure contacts the molding member.

9. The process according to claim 1, further comprising a step of controlling a thickness of the resinous material joined to the reinforcing structure to at least one pre-selected value.

10. The process according to claim 4, wherein in the step (f) the resinous material is transferred to the reinforcing structure in a substantially continuous pattern.

11. The process according to claim 4, wherein in the step (f) the resinous material is transferred to the reinforcing structure in a pattern comprising a plurality of discrete protuberances.

12. The process according to claim 1, wherein in the step (g) the resinous material extends outwardly from the first side of the reinforcing structure after the resinous material has been joined to the reinforcing structure.

13. The process according to claim 1, wherein the reinforcing structure comprises a woven fabric or a screen having a plurality of open areas therethrough.

14. The process according to claim 1, wherein in the step (b) providing a flowable resinous material comprises providing a material selected from the group consisting of epoxies, silicones, urethanes, polystyrenes, polyolefins, polysulfides, nylons, butadienes, photopolymers, and any combination thereof.

15. The process according to claim 1, further comprising a step of treating the molding pockets with a release agent prior to the step (d).

16. A process for making a papermaking belt comprising a reinforcing structure and a resinous framework joined thereto, the process comprising the steps
   (a) providing a fluid-permeable reinforcing structure having a first side, a second side opposite to the first side, and a thickness formed therebetween;
   (b) providing a flowable resinous material;
   (c) providing a molding member comprising a pattern of fluid-permeable molding pockets therein, the molding pockets being structured to receive the flowable resinous material therein;
   (d) depositing the flowable resinous material into the molding pockets of the molding member;
   (e) juxtaposing the reinforcing structure with the molding member;
   (f) applying a fluid pressure differential to the flowable resinous material disposed into the molding pockets of the molding member to transfer the flowable resinous material from the molding member to the reinforcing structure such that the flowable resinous material and the reinforcing structure join together; and
   (g) solidifying the flowable resinous material transferred to the reinforcing structure, thereby forming the resinous framework joined to the reinforcing structure, whereby the papermaking belt is formed.

\* \* \* \* \*

UNITED STATES PATENT AND TRADEMARK OFFICE
Certificate

Patent No. 6,251,331 B1                                  Patented: June 26, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Robert S. Ampulski, Fairfield, Ohio.

Signed and Sealed this Sixteenth Day of April 2002.

JAN H. SILBAUGH
*Supervisory Patent Examiner*
Art Unit 1732